(12) United States Patent
Agarwal et al.

(10) Patent No.: US 11,986,955 B2
(45) Date of Patent: May 21, 2024

(54) IN-HAND POSE REFINEMENT FOR PICK AND PLACE AUTOMATION

(71) Applicant: INTRINSIC INNOVATION LLC, Mountain View, CA (US)

(72) Inventors: Rishav Agarwal, Waterloo (CA); Achuta Kadambi, Los Altos Hills, CA (US); Agastya Kalra, Nepean (CA); Kartik Venkataraman, San Jose, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 142 days.

(21) Appl. No.: 17/471,063

(22) Filed: Sep. 9, 2021

(65) Prior Publication Data

US 2023/0071384 A1 Mar. 9, 2023

(51) Int. Cl.
*B25J 19/02* (2006.01)
*B25J 13/08* (2006.01)
*G06T 7/00* (2017.01)

(52) U.S. Cl.
CPC ........... *B25J 19/023* (2013.01); *B25J 13/089* (2013.01); *G06T 7/0004* (2013.01)

(58) Field of Classification Search
CPC ...... B25J 19/023; B25J 13/089; B25J 9/1697; G06T 7/0004; G05B 2219/39017; G05B 2219/40557
See application file for complete search history.

(56) References Cited

U.S. PATENT DOCUMENTS

| | | | | |
|---|---|---|---|---|
| 10,569,414 | B2 * | 2/2020 | Nakashima | B25J 9/0093 |
| 2017/0282363 | A1 * | 10/2017 | Yamada | B25J 9/1612 |
| 2018/0126553 | A1 * | 5/2018 | Corkum | B25J 9/1697 |
| 2019/0381662 | A1 * | 12/2019 | Taira | B25J 9/1682 |
| 2020/0070340 | A1 * | 3/2020 | Kurtz | B25J 9/1679 |
| 2021/0178583 | A1 * | 6/2021 | Ye | B25J 9/1653 |

FOREIGN PATENT DOCUMENTS

WO    WO2021/155308 A1    8/2021

OTHER PUBLICATIONS

An, Gwon Hwan, et al. "Charuco board-based omnidirectional camera calibration method." Electronics 7.12 (2018): 421, 15 pages.
Atkinson, G.A. et al., "Recovery of Surface Orientation from Diffuse Polarization," IEEE Transactions on Image Processing, vol. 15, No. 6, Jun. 2006, 13 pages.

(Continued)

*Primary Examiner* — Kira Nguyen
(74) *Attorney, Agent, or Firm* — Fish & Richardson P.C.

(57) ABSTRACT

A method of tracking a pose of an object includes determining an initial pose of the object at a first position, receiving position data and velocity data corresponding to movement of the object to a second position by a moving device, determining an expected pose of the object at the second position based on the position and velocity data and the initial pose, receiving second image data corresponding to the object at the second position from a camera, and determining a refined pose of the object at the second position based on the second image data and the expected pose.

20 Claims, 7 Drawing Sheets

(56) References Cited

OTHER PUBLICATIONS

Drost, B., et al. "Model globally, match locally: Efficient and robust 3D object recognition." 2010 IEEE Computer Society Conference on Computer Vision and Pattern Recognition. IEEE, 2010, 8 pages.
Garrido-Jurado, S., et al. "Automatic generation and detection of highly reliable fiducial markers under occlusion." Pattern Recognition 47 (2014): 2280-2292.
Gecks, Thorsten, and Dominik Henrich. "Human-robot cooperation: safe pick-and-place operations." *ROMAN 2005. IEEE International Workshop on Robot and Human Interactive Communication*, 2005. IEEE, 2005.
Gualtieri, Marcus, and Robert Platt. "Learning 6-dof grasping and pick-place using attention focus." *Conference on Robot Learning*. PMLR, 2018.
Gualtieri, Marcus, Andreas ten Pas, and Robert Platt. "Category level pick and place using deep reinforcement learning." *CoRR, abs/1707.05615* (2017).
Haustein, Joshua A., et al. "Placing objects with prior in-hand manipulation using dexterous manipulation graphs." 2019 *IEEE-RAS 19th International Conference on Humanoid Robots (Humanoids)*. IEEE, 2019.
Holladay, Anne, et al. "Object placement as inverse motion planning." 2013 *IEEE International Conference on Robotics and Automation*. IEEE, 2013.
Jiang, Yun, et al. "Learning to place new objects." 2012 *IEEE International Conference on Robotics and Automation*. IEEE, 2012.
Lin, Hsien-I., and Y. P. Chiang. "Understanding human hand gestures for learning robot pick-and-place tasks." *International Journal of Advanced Robotic Systems* 12.5 (2015): 49.
Littmann, E., A. Drees, and H. Ritter. "Robot guidance by human pointing gestures." *Proceedings of International Workshop on Neural Networks for Identification, Control, Robotics and Signal/Image Processing*. IEEE, 1996.
Mahler, Jeffrey, and Ken Goldberg. "Learning deep policies for robot bin picking by simulating robust grasping sequences." *Conference on robot learning*. PMLR, 2017.
Paolini, Robert, et al. "A data-driven statistical framework for post-grasp manipulation." *The International Journal of Robotics Research* 33.4 (2014): 600-615.
Rudorfer, Martin, et al. "Holo Pick'n'Place." 2018 *IEEE 23rd International Conference on Emerging Technologies and Factory Automation (ETFA)*. vol. 1. IEEE, 2018, 4 pages.
Ten Pas, Andreas, and Robert Platt. "Using geometry to detect grasp poses in 3d point clouds." *Robotics Research*. Springer, Cham, 2018. 307-324.
Song, Shuran, et al., "Grasping in the Wild: Learning 6DoF Closed-Loop Grasping from Low-Cost Demonstrations," IEEE Robotics and Automation Letters, 2020, 8 pages.
Bimbo et al., "Combining touch and vision for the estimation of an object's pose during manipulation," 2013 IEEE/RSJ International Conference on Intelligent Robots and Systems, Nov. 3, 2013, pp. 4021-4026.
Herbert et al., "Fusion of stereo vision, force-torque, and joint sensors for estimation of in-hand object location," 2011 IEEE International Conference on Robotics and Automation, May 9-13, 2011, pp. 5935-5941.
International Search Report and Written Opinion in International Appln. No. PCT/US2022/042762, dated Dec. 20, 2022, 19 pages.
Pfanne et al., ""Fusing Joint Measurements and Visual Features for In-Hand Object Pose Estimation," IEEE Robotics and Automation Letters, Oct. 1, 2018, 3(4):3497-3504".

* cited by examiner

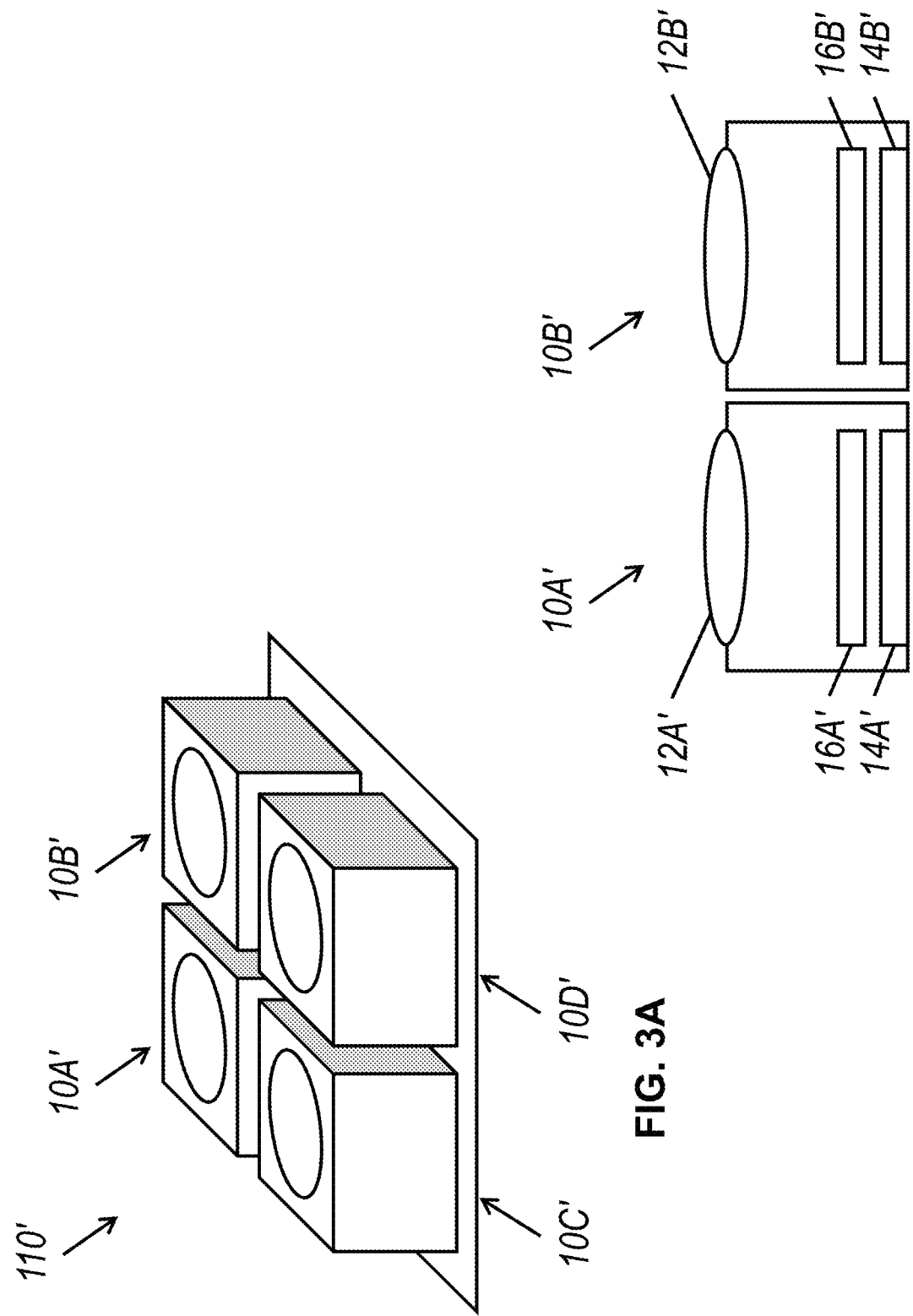

IN-HAND POSE REFINEMENT FOR PICK AND PLACE AUTOMATION

FIELD

Aspects of embodiments of the present disclosure are generally related to systems and methods for automated pose tracking.

BACKGROUND

Pick and place is an important problem in industrial assembly applications. In such applications, a robot may pick up an object and, for example, place it at fixed pose for assembly. Robotic systems often use sensing systems to measure the locations of various physical objects in order to, for example, grasp an object that may arrive at a variety of orientations, reorient the object into a desired position, and connect the object to another object. The position and orientation of an object with respect to a reference coordinate system may be referred to as a "pose" and, in a three-dimensional coordinate system, generally includes six degrees of freedom (6DoF)—rotation around three axes and translation along the three axes. While there are some techniques for estimating an initial 6DoF pose of an object before pick up, after the robot picks up the object the 6DoF pose of the object changes. Determining the correct 6DoF pose of the object during placement is critical for assembly. Moreover, tracing the 6DoF pose of the object while moving is important to ensure that the object remains in grip. Often human intervention is required for monitoring such assembly processes. For example, a human user may have to reset the robot arm, which adds to cycle time. Also, vicinity to a high-voltage robot arm could present a safety hazard to the user. On the other hand, fully automated methods based on the Markov decision process (MDP) may not be accurate and are thus often not reliable methods for object movement and placement. Furthermore, existing pose estimation techniques that are more accurate are generally computationally intensive, which makes them unsuitable for real-time pose tracking.

The above information disclosed in this Background section is only for enhancement of understanding of the present disclosure, and therefore it may contain information that does not form the prior art that is already known to a person of ordinary skill in the art.

SUMMARY

Aspects of embodiments of the present disclosure relate to a system and method for tracing poses of an object as it is moved by a robotic system. In some embodiments, the pose tracking system improves accuracy of placement, reduces cycle time, and makes workspaces safer for humans as they do not have to be in close vicinity of high voltage robotic arms. In some embodiments, the pose tracking system includes a moveable camera system that is programmed to track movements of a robotic arm carrying an object. This allows a camera of limited field of view to capture the entire range of motion of the robot arm.

According to some embodiments of the present disclosure, there is provided a method of tracking a pose of an object, the method including: determining an initial pose of the object at a first position; receiving position data and velocity data corresponding to movement of the object to a second position by a moving device; determining an expected pose of the object at the second position based on the position and velocity data and the initial pose; receiving second image data corresponding to the object at the second position from a camera; and determining a refined pose of the object at the second position based on the second image data and the expected pose.

In some embodiments, the moving device includes a robotic arm configured to grasp the object and to move the object from the first position to the second position.

In some embodiments, the camera includes a stereo-pair of camera modules, and the second image data includes a depth map or a surface normals map of the object at the second position.

In some embodiments, the initial pose, the expected pose, and the refined pose each correspond to a six-degrees-of-freedom (6DoF) pose of the object.

In some embodiments, the determining the initial pose of the object at the first position includes: receiving first image data corresponding to the object at the first position from the camera or an other camera; identifying a 3-D model corresponding to the object; and aligning the 3-D model to be consistent with an appearance of the object associated with the first image data, and to generate the initial pose of the object.

In some embodiments, the first image data includes a first depth map or a first surface normals map of the object, and aligning the 3-D model includes: extracting observed keypoints of the object from the first depth map or the first surface normals map of the object.

In some embodiments, the 3-D model includes a plurality of modeled keypoints of the object, and the aligning the 3-D model further includes: applying an iterative closest point (ICP) algorithm or a point pair feature matching algorithm to align the modeled keypoints with the observed keypoints.

In some embodiments, the determining the expected pose of the object at the second position includes: identifying initial keypoints of the object based on the initial pose; performing transformations on the initial keypoints based on the position and velocity data to generate expected keypoints; and determining the expected pose based on the expected keypoints.

In some embodiments, the refined pose is a more accurate representation of an actual pose of the object than the expected pose.

In some embodiments, the determining the refined pose of the object at the second position includes: identifying estimated keypoints of the object based on the second image data; aligning the estimated keypoints with expected keypoints, by applying an iterative closest point (ICP) algorithm or a point pair feature matching algorithm to the estimated and expected keypoints, to generate aligned keypoints; and determining the refined pose of the object based on the aligned keypoints.

In some embodiments, the second image data includes a second depth map or a second surface normals map of the object, and the identifying estimated keypoints includes: extracting the estimated keypoints of the object from the second depth map or the second surface normals map of the object.

In some embodiments, the method further includes: calibrating the camera to the moving device at the first position; and recalibrating the camera to the moving device at the second position based on the second image data, wherein the second image data includes calibration pattern data corresponding to a calibration pattern on the moving device.

In some embodiments, the recalibrating the camera to the moving device at the second position includes: compute expected calibration points based on the position and velocity data and an initial calibration of the camera to the moving device; identifying observed calibration points based on the second image data; aligning the observed calibration points with the expected calibration points, by applying an iterative closest point (ICP) algorithm or a point pair feature matching algorithm to the observed and expected calibration points, to generate refined calibration points; and calibrating the camera to the moving device based on the refined calibration points.

According to some embodiments of the present disclosure, there is provided a pose tracking system including: a camera configured to capture image data corresponding to an object being moved according to position data and velocity data; a processor; and a memory configured to store instructions that, when executed by the processor, cause the processor to perform: determining an initial pose of the object at a first position; receiving position data and velocity data corresponding to movement of the object to a second position by a moving device; determining an expected pose of the object at the second position based on the position and velocity data and the initial pose; receiving second image data corresponding to the object at the second position from a camera; and determining a refined pose of the object at the second position based on the second image data and the expected pose.

In some embodiments, the pose tracking system further includes: the moving device that is configured to move the object according to the position data and the velocity data, wherein the moving device includes a robot arm configured to pick up the object from the first position, and to move the object according to the position and velocity data to the second position.

In some embodiments, the camera is coupled to a moveable camera platform configured to track movements of the moving device to ensure that the moving device is within a field of view of the camera.

In some embodiments, the camera includes a plurality of stereo-pair cameras having partially overlapping fields of view that cover an entire range of motion of the moving device.

In some embodiments, the determining the expected pose of the object at the second position includes: identifying initial keypoints of the object based on the initial pose; performing transformations on the initial keypoints based on the position and velocity data to generate expected keypoints; and determining the expected pose based on the expected keypoints.

In some embodiments, the determining the refined pose of the object at the second position includes: identifying estimated keypoints of the object based on the second image data; aligning the estimated keypoints with the expected keypoints, by applying an iterative closest point (ICP) algorithm or a point pair feature matching algorithm to the estimated and expected keypoints, to generate aligned keypoints; and determining the refined pose of the object based on the aligned keypoints.

In some embodiments, the second image data includes a second depth map or a second surface normals map of the object, and the identifying the estimated keypoints includes: extracting the estimated keypoints of the object from the second depth map or the second surface normals map of the object.

BRIEF DESCRIPTION OF THE DRAWINGS

The accompanying drawings, together with the specification, illustrate example embodiments of the present disclosure, and, together with the description, serve to explain the principles of the present disclosure.

FIG. 3A is a perspective view of a camera array, according to one embodiment of the present disclosure.

FIG. 3B is a cross sectional view of a portion of a camera array, according to one embodiment of the present disclosure.

DETAILED DESCRIPTION

Figure 1A:
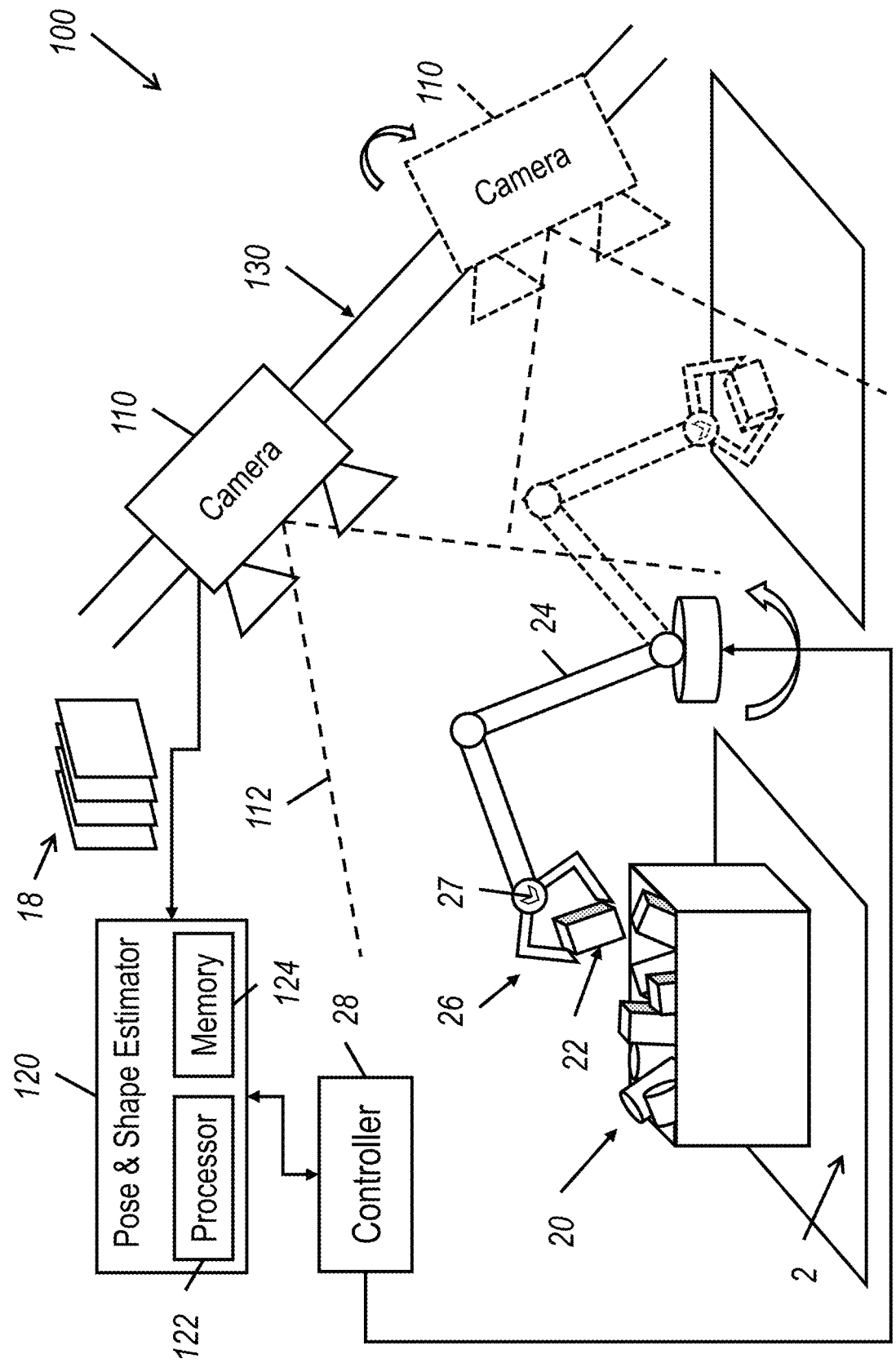
FIG. 1A is a schematic diagram depicting the pose tracking system utilizing a single camera, according to one embodiment of the present disclosure.

The detailed description set forth below is intended as a description of example embodiments of a system and method for tracing a pose of a moving object, provided in accordance with the present disclosure, and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Pose estimation generally refers to a technique for estimating or predicting the location and orientation of objects. Pose estimation may refer generally to the position and orientation of various animate or inanimate physical objects in a scene. For example, autonomously navigating robots may maintain information regarding the physical poses of objects around them (e.g., humans, vehicles, equipment, other robots, barriers, doors, and the like) in order to avoid collisions and to predict trajectories of other moving objects. As another example, in the case of robotics for use in manufacturing, pose estimation may be used to detect the position and orientation of components and workpieces such that a robotic arm can approach the components and workpieces from the correct angle to obtain a proper grip on the part for assembly with other components of a manufactured product (e.g., gripping the head of a screw and threading the screw into a hole, whereas gripping a screw by the tip would make it difficult to insert into a hole, or gripping a flexible printed circuit, flexible circuit, or flex circuit and attaching the ends of the connector to different components of the manufactured product, such as connecting a flexible printed circuit to two different rigid circuit boards) and orient and/or reorient components and workpieces for assembly. To ensure that an object being moved is being grasped and placed correctly, it is desirable to track the pose (i.e., the six degree of freedom (6DoF) pose) of the object as it is being moved (e.g., in real-time).

Accordingly, some aspects of the present disclosure relate to quickly computing (e.g., in real-time) high-accuracy pose estimates (e.g., 6DoF pose estimates) of a moving object in a scene based on image data captured by one or more cameras and the expected pose of the object. In some embodiments, a pose tracking system determines the expected pose of the object by using the initial pose estimate of the object prior to movement and its known trajectory. In some embodiments, the image data includes calibration information corresponding to a calibration marker on a robot arm that is carrying the object. This allows the pose tracking system to maintain calibration of the robot arm to the camera despite movement of the arm and/or camera.

Figure 1B:
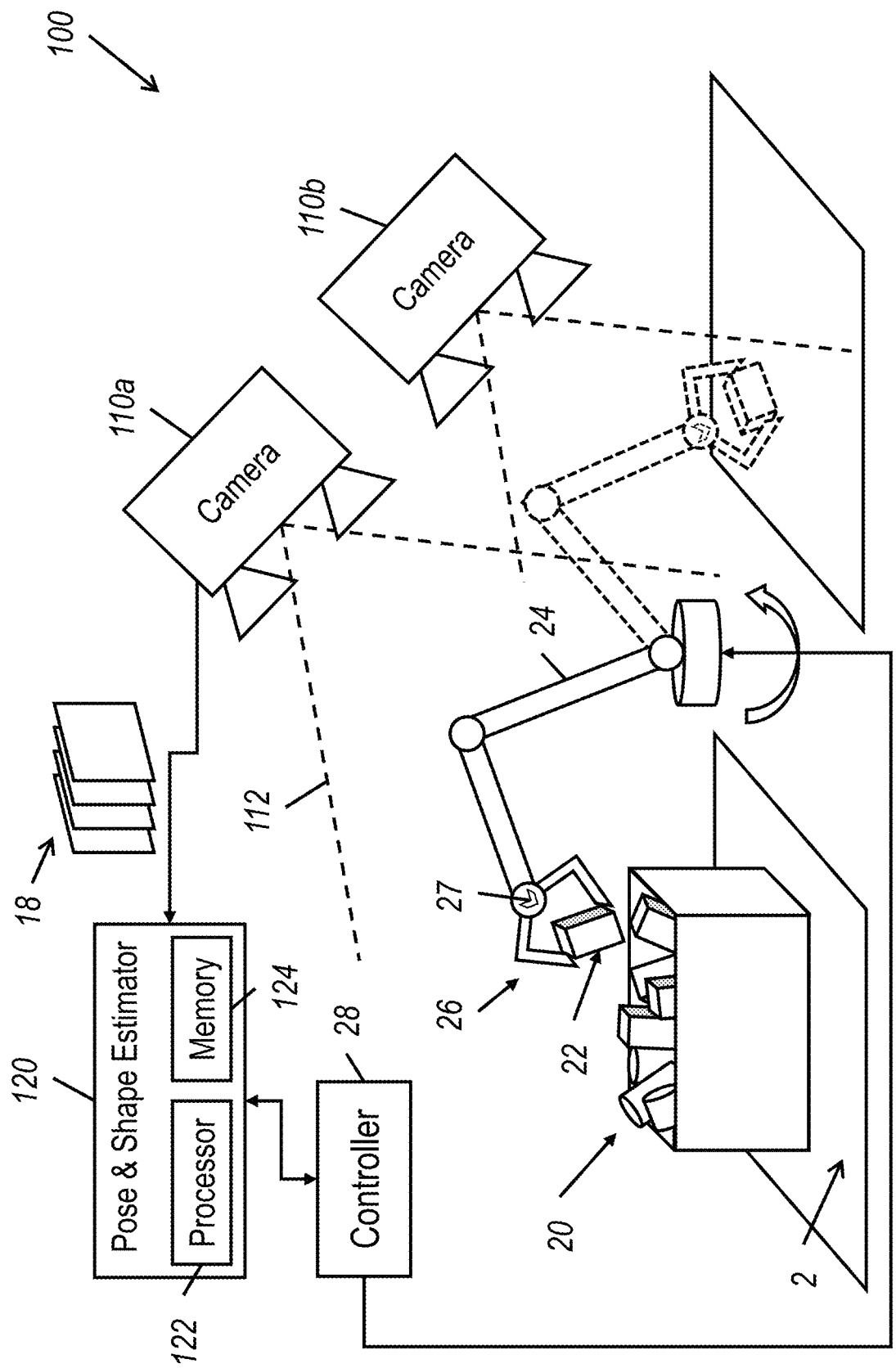
FIG. 1B is a schematic diagram depicting the pose tracking system utilizing a plurality of cameras, according to one embodiment of the present disclosure.

FIG. 1A is a schematic diagram depicting the pose tracking system utilizing a single camera, according to one embodiment of the present disclosure. FIG. 1B is a schematic diagram depicting the pose tracking system utilizing a plurality of cameras, according to one embodiment of the present disclosure.

According to some embodiments, the pose tracking system 100 includes a camera 110 and a pose estimator 120. As illustrated in FIG. 1A, the camera 110 is arranged such that its field of view 112 captures an arrangement 20 of objects 22 resting on a support platform 2 in a scene 1. The pose and position of the objects 22 may be manipulated by the robotic arm 24 (or, more generally, a moving device). The robotic arm 24 may have an end effector 26 that may be used to grasp and pick up an object 22 from an initial location (e.g., from a bin, or conveyor belt, etc.) and to move, change the orientation of, and place the object 22 at a different location. The camera 110 is positioned to capture images of the robotic arm 24 and the object 22 that is being carried in its field of view 112. The images captured by the camera are relayed to the pose estimator 120, which determines the pose of the object 22, and transmits the pose information to the controller 28 to assist in the control of the robotic arm 24. The operations performed by the pose estimator 120 may be performed by a processor 122 executing instructions that are stored in a memory 124.

In some embodiments, the controller 28 receives the six-degree-of-freedom pose and/or shape of the object 22 computed by the pose estimator 120, which may include 3-D models representing various objects 22 in the scene 1, where the 3-D models have configurations that estimate or approximate the configurations of their corresponding real-world objects.

While FIG. 1A illustrates the use of a pose estimator 120, embodiments of the present disclosure are not limited to computing shapes and poses (e.g., 6DoF poses) of objects in a scene and may, instead of or in addition to computing 6DoF poses, implement generalized vision systems that provide information to controller systems. For example, a processing pipeline may include receiving images captured by sensor devices (e.g., one or more cameras 10) and outputting control commands for controlling a robot arm, where the processing pipeline is trained, in an end-to-end manner, based on training data that includes sensor data as input and commands for controlling the robot arm (e.g., a destination pose for the end effector 26 of the robotic arm 24) as the labels for the input training data.

While FIG. 1A illustrates the camera 110 as being above and at an angle with respect to the support platform 2 (to have a downward angled view of the object 22), embodiments of the present disclosure are not limited thereto, and the camera may be at any suitable location to have a sufficiently clear view of the object 22 as it is being moved by the robotic arm 24.

In some examples, the field of view of the camera 110 (which may, e.g., be 60 degrees to about 80 degrees) may not be sufficiently wide to capture the entire range of motion of the robotic arm 24. Thus, in some embodiments, the pose tracking system 100 further includes a camera platform 130 coupled to the camera 110 and is configured to move the camera 110 along a path that follows the robotic arm 24 and ensures that the object 22 and robotic arm 24 are within the field of view 112 of the camera 110 as it is moving from a first position (e.g., object pick up location) to a second position (e.g., the final destination of the object 22). The camera platform 130 may also be able to rotate the camera 110 as desired. The pan and rotate actions of the camera 110 that is mounted to the camera platform 130 can be represented by matrix transformations, which are used by the pose estimator 120 to compute the pose estimate of the object 22 as it is being moved along its path (e.g., predetermined path). This is described in further detail below.

As the movement of the robotic arm 24 may be preprogrammed, the path for the camera 110 to follow may be known in advance. In such examples, the camera platform 130 may move the camera 110 along a predetermined path (e.g., a predetermined track) with a set timing and speed to maintain the robotic arm 24 and object 22 in the camera's field of view 112. However, embodiments of the present disclosure are not limited to using a moving camera setup.

For example, referring to FIG. 1B, the pose tracking system 100 may utilize a plurality of cameras 110 (e.g., a first camera 110a and a second camera 110b) to capture the full range of motion of the object 22 and robotic arm 24. Neighboring cameras 110 may have at least partially overlapping fields of view to ensure continuity in tracking the object 22 across the fields of view of the cameras 110. Having different viewpoints from different cameras may help to track the object 22 even when the robotic arm 24 itself is occluding the object 22 from one view point or when the movement causes the object to disappear from the view of one of the cameras. Further, having more cameras may provide more view points from which to align the keypoints of the object 22, and thus, potentially result in a more accurate pose estimation by the pose estimator 120. In such embodiments, the cameras 110 may be synchronized with one another (e.g., the cameras 110 may capture images simultaneously or substantially simultaneously).

While FIGS. 1A-1B illustrate example embodiments in which a camera platform or a plurality of cameras are used, embodiments of the present disclosure are not limited thereto. For example, when the field of view 112 of a stationary camera 110 is sufficiently wide to capture the full range of motion of the robotic arm (such the moving object 22 is always within its field of view), the camera platform and other cameras may be omitted from the pose tracking system 100.

In some examples, the robotic arm 24 has a calibration pattern 27 (e.g., a QR-like code such as an ArUco marker) that may be used to calibrate the camera 110 to the robotic arm 24. The calibration pattern 27 may be at a location on robotic arm 24 that is near the grasped object 22 (e.g., near or on the end effector 26). This may allow the calibration pattern 27 to appear in the same captured image as the object 22. As such, the same captured image used to track the pose of the object 22 by the pose estimator 120 may be used to calibrate/recalibrate the camera 110 with the robotic arm 24. In some examples, the camera 110 may be calibrated to global coordinates by using a calibration pattern/mark that is fixed to a certain point with respect to origin of the global coordinate system (e.g., on a wall, floor, etc.).

As used herein, a stereo camera will be referred to as capturing images from a single viewpoint, as the multiple camera modules of a stereo camera generally have optical axes that are substantially parallel to one another (and may be rectified to synthetically produce such parallel optical axes) and are generally spaced apart along a relatively short baseline to generate a depth map using stereo from a single viewpoint.

The pose estimator 120 according to various embodiments of the present disclosure is configured to compute or estimate shapes and/or poses of the objects 22 based on information captured by the camera 10. According to various embodiments of the present disclosure, the pose estimator 120 is implemented using one or more processing circuits or electronic circuits configured to perform various operations as described in more detail below. Types of electronic circuits may include a central processing unit (CPU), a graphics processing unit (GPU), an artificial intelligence (AI) accelerator (e.g., a vector processor, which may include vector arithmetic logic units configured efficiently perform operations common to neural networks, such dot products and softmax), a field programmable gate array (FPGA), an application specific integrated circuit (ASIC), a digital signal processor (DSP), or the like. For example, in some circumstances, aspects of embodiments of the present disclosure are implemented in program instructions that are stored in a non-volatile computer readable memory where, when executed by the electronic circuit (e.g., a CPU, a GPU, an AI accelerator, or combinations thereof), perform the operations described herein to compute a processing output, such as a 6DoF pose, from input images 18 (including, for example, polarization raw frames or the underlying images captured by polarization cameras or cameras with polarization filters in their optical paths). The operations performed by the pose estimator 120 may be performed by a single electronic circuit (e.g., a single CPU, a single GPU, or the like) or may be allocated between multiple electronic circuits (e.g., multiple GPUs or a CPU in conjunction with a GPU). The multiple electronic circuits may be local to one another (e.g., located on a same die, located within a same package, or located within a same embedded device or computer system) and/or may be remote from one other (e.g., in communication over a network such as a local personal area network such as Bluetooth®, over a local area network such as a local wired and/or wireless network, and/or over wide area network such as the internet, such a case where some operations are performed locally and other operations are performed on a server hosted by a cloud computing service). One or more electronic circuits operating to implement the pose estimator 120 may be referred to herein as a computer or a computer system, which may include memory storing instructions that, when executed by the one or more electronic circuits, implement the systems and methods described herein.

In the embodiments shown in FIG. 1A, the objects 22 are depicted abstractly as simple three-dimensional solids such as rectangular prisms, and cylinders. However, embodiments of the present disclosure are not limited thereto and characterization of pose estimator 120 may be performed using any arbitrary object for which a pose with respect to a camera can be clearly defined, including deformable objects, such as flex circuits, bags or other pliable containers containing solids, liquids, and/or fluids, flexible tubing, and the like.

In particular, a "pose" refers to the position and orientation of an object with respect to a reference coordinate system. For example, a reference coordinate system may be defined with the camera 110 at the origin, where the direction along the optical axis of the camera 110 (e.g., a direction through the center of its field of view 112) is defined as the z-axis of the coordinate system, and the x and y axes are defined to be perpendicular to one another and perpendicular to the z-axis. (Embodiments of the present disclosure are not limited to this particular coordinate system, and a person having ordinary skill in the art would understand that poses can be mathematically transformed to equivalent representations in different coordinate systems.)

Each object 22 may also be associated with a corresponding coordinate system of its own, which is defined with respect to its particular shape. For example, a rectangular prism with sides of different lengths may have a canonical coordinate system defined where the x-axis is parallel to its shortest direction, z-axis is parallel to its longest direction, the y-axis is orthogonal to the x-axis and z-axis, and the origin is located at the centroid of the object 22.

Generally, in a three-dimensional coordinate system, objects 22 have six degrees of freedom—rotation around three axes (e.g., rotation around x-, y-, and z-axes) and translation along the three axes (e.g., translation along x-, y-, and z-axes). For the sake of clarity, symmetries of the objects 22 will not be discussed in detail herein, but may be addressed, for example, by identifying multiple possible poses with respect to different symmetries (e.g., in the case of selecting the positive versus negative directions of the z-axis of a right rectangular prism), or by ignoring some rotational components of the pose (e.g., a right cylinder is rotationally symmetric around its axis).

In some embodiments, it is assumed that a three-dimensional (3-D) model or computer aided design (CAD) model representing a canonical or ideal version of each type of object 22 in the arrangement of objects 20 is available. For example, in some embodiments of the present disclosure, the objects 22 are individual instances of manufactured components that have a substantially uniform appearance from one component to the next. Examples of such manufactured components include screws, bolts, nuts, connectors, and springs, as well as specialty parts such electronic circuit components (e.g., packaged integrated circuits, light emitting diodes, switches, resistors, and the like), laboratory supplies (e.g. test tubes, PCR tubes, bottles, caps, lids, pipette tips, sample plates, and the like), and manufactured parts (e.g., handles, switch caps, light bulbs, and the like). Accordingly, in these circumstances, a CAD model defining the ideal or canonical shape of any particular object 22 in the arrangement 20 may be used to define a coordinate system for the object (e.g., the coordinate system used in the representation of the CAD model).

Based on a reference coordinate system (or camera space, e.g., defined with respect to the pose estimation system) and an object coordinate system (or object space, e.g., defined with respect to one of the objects), the pose of the object may be considered to be a rigid transform (rotation and translation) from object space to camera space. The pose of object 1 in camera space 1 may be denoted as $P_{c_1}^1$, and the transform from object 1 space to camera space may be represented by the matrix:

$$\begin{bmatrix} R_{11} & R_{12} & R_{13} & T_1 \\ R_{21} & R_{22} & R_{23} & T_2 \\ R_{31} & R_{32} & R_{33} & T_3 \\ 0 & 0 & 0 & 1 \end{bmatrix}$$

where the rotation submatrix R:

$$R = \begin{bmatrix} R_{11} & R_{12} & R_{13} \\ R_{21} & R_{22} & R_{23} \\ R_{31} & R_{32} & R_{33} \end{bmatrix}$$

represents rotations along the three axes from object space to camera space, and the translation submatrix T:

$$T = \begin{bmatrix} T_1 \\ T_2 \\ T_3 \end{bmatrix}$$

represents translations along the three axes from object space to camera space.

If two objects—Object A and Object B—are in the same camera C coordinate frame, then the notation $P_{CA}$ is used to indicate the pose of Object A with respect to camera C and $P_{CB}$ is used to indicate the pose of Object B with respect to camera C. For the sake of convenience, it is assumed herein that the poses of objects are represented based on the reference coordinate system, so the poses of objects A and B with respect to camera space C may be denoted $P_A$ and $P_B$, respectively.

If Object A and Object B are actually the same object, but performed during different pose estimation measurements, and a residual pose $P_{err}$ or $P_{AB}$ ($P_{AB}=P_{err}$) is used to indicate a transform from pose $P_A$ to pose $P_B$, then the following relationship should hold:

$$P_A P_{err} = P_B \tag{1}$$

and therefore $$P_{err} = P_A^{-1} P_B \tag{2}$$

Ideally, assuming the object has not moved (e.g., translated or rotated) with respect to the camera 110 between the measurements of pose estimates $P_A$ and $P_B$, then $P_A$ and $P_B$ should both be the same, and $P_{err}$ should be the identity matrix (e.g., indicating no error between the poses):

$$\begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

In a similar manner, the pose of a particular object can be computed with respect to views from two different cameras. For example, images of Object A captured by a main camera C (e.g., a first camera) can be used to compute the pose $P_{CA}$ of Object A with respect to main camera C. Likewise, images of Object A captured by a first support camera $S_1$ (e.g., a second camera) can be used to compute the pose $P_{S_1A}$ of object A with respect to the support camera $S_1$. If the relative poses of main camera C and support camera $S_1$ are known, then the pose $P_{S_1A}$ can be transformed to the coordinate system of the main camera C.

Ideally, assuming that the known relative poses of main camera C and support camera $S_1$ are accurate and the poses calculated based on the data captured by the two cameras is accurate, then $P_{CA}$ and $P_{S_1A}$ should both be the same, and $P_{err}$ should be the identity matrix (e.g., indicating no error between the poses):

$$\begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

Differences $P_{err}$ between the actual measured value as computed based on the estimates computed by the pose estimator 120 and the identity matrix may be considered to be errors:

$$R_{err} = \|R(P_{err})\| \tag{3}$$

$$T_{err} = \|T(P_{err})\| \tag{4}$$

where $R_{err}$ is the rotation error and $T_{err}$ is the translation error. The function $R(\cdot)$ converts $P_{err}$ into an axis-angle where the magnitude is the rotation difference, and the function $T(\cdot)$ extracts the translation component of the pose matrix.

The axis-angle representation from rotation matrix R is given by:

$$Tr(R) = 1 + 2\cos\theta \tag{5}$$

$$|\theta| = \arccos\left(\frac{Tr(R) - 1}{2}\right) \tag{6}$$

where $Tr(\cdot)$ denotes the matrix trace (the sum of the diagonal elements of the matrix), and $\theta$ represents the angle of rotation.

Some aspects of embodiments of the present disclosure relate to computing a high accuracy pose estimate of objects 22 in a scene based on a joint estimate of the poses the objects across a plurality of cameras 110 (e.g., a first camera 110a and a second camera 110b), as described in more detail below.

While, in some embodiments, the camera 110 includes a pair of RGB stereo cameras for capturing opaque objects, embodiments of the present disclosure are not limited thereto, and the pose tracking system 100 may be configured to track transparent or semi-transparent objects using polarization cameras.

Polarization imaging provides information that would not be available to comparative cameras (e.g., imaging modalities that do not include polarization filters and that therefore do not capture information about the polarization of light). This information includes detecting the shape of reflective and transparent objects, determining the surface normals of objects using Fresnel equations, and robustness to specular reflections (e.g., glare). Accordingly, the use of scene polarization information, in the form of polarization images and/or polarization features (e.g., AOLP/DOLP) provides additional information to that can be used by computer vision models to compute more accurate classifications of objects and detections of their locations, poses, and shapes.

The interaction between light and transparent objects is rich and complex, but the material of an object determines its transparency under visible light. For many transparent household objects, the majority of visible light passes straight through and a small portion (~4% to ~8%, depending on the refractive index) is reflected. This is because light in the visible portion of the spectrum has insufficient energy to excite atoms in the transparent object. As a result, the texture (e.g., appearance) of objects behind the transparent object (or visible through the transparent object) dominate the appearance of the transparent object. For example, when looking at a transparent glass cup or tumbler on a table, the appearance of the objects on the other side of the tumbler (e.g., the surface of the table) generally dominate what is seen through the cup. This property leads to some difficulties when attempting to detect surface characteristics of transparent objects such as glass windows and glossy, transparent layers of paint, based on intensity images alone.

Figure 2:
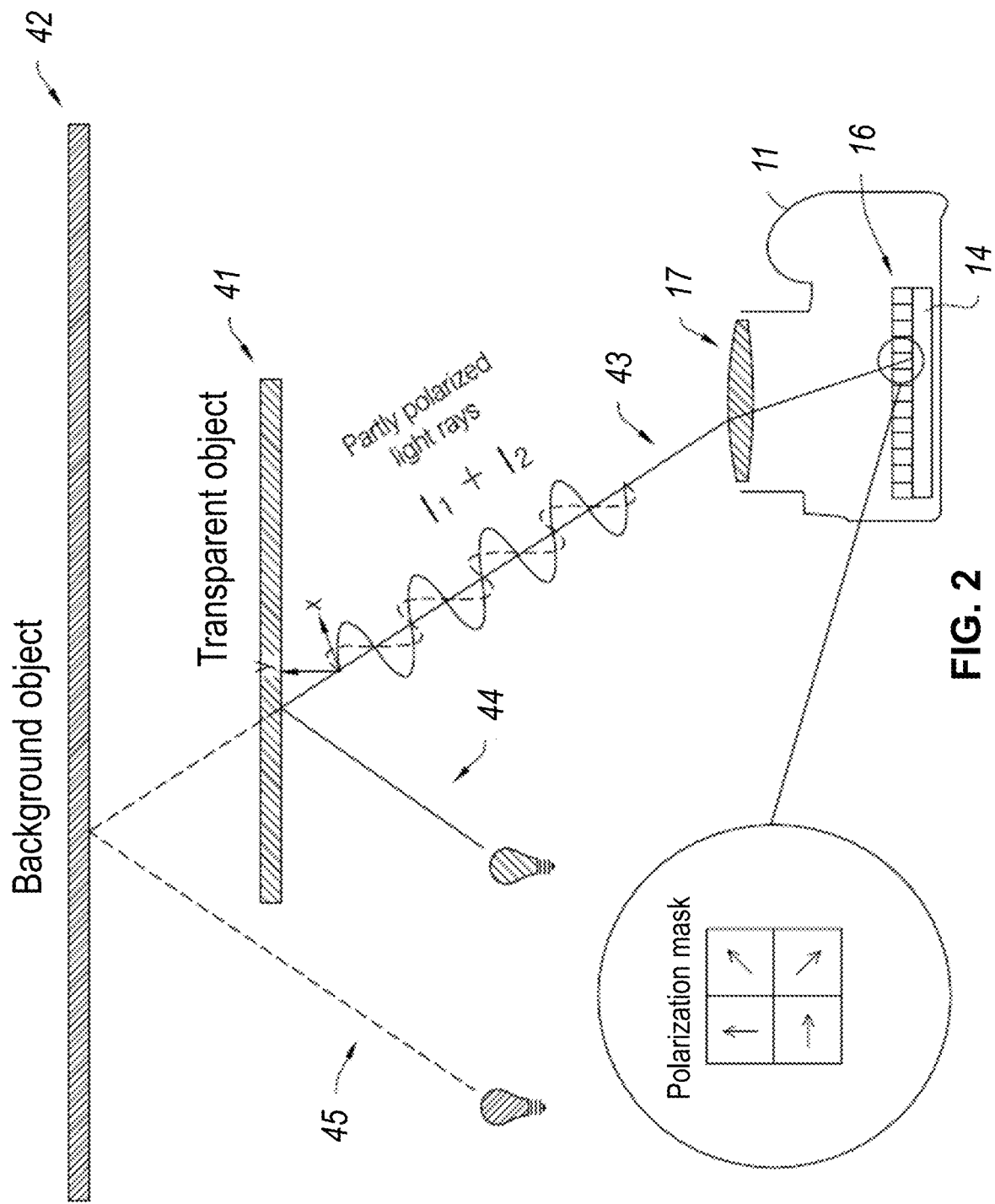
FIG. 2 is a high-level depiction of the interaction of light with transparent objects and non-transparent (e.g., diffuse and/or reflective) objects.

FIG. 2 is a high-level depiction of the interaction of light with transparent objects and non-transparent (e.g., diffuse and/or reflective) objects.

As shown in FIG. 2, in some embodiments the camera 110 includes a polarization camera 11 that captures polarization raw frames of a scene that includes a transparent object 41 in front of an opaque background object 42. A light ray 43 hitting the image sensor 14 of the polarization camera contains polarization information from both the transparent object 41 and the background object 42. The small fraction of reflected light 44 from the transparent object 41 is heavily polarized, and thus has a large impact on the polarization measurement, in contrast to the light 45 reflected off the background object 42 and passing through the transparent object 41.

Similarly, a light ray hitting the surface of an object may interact with the shape of the surface in various ways. For example, a surface with a glossy paint may behave substantially similarly to a transparent object in front of an opaque object as shown in FIG. 2, where interactions between the light ray and a transparent or translucent layer (or clear coat layer) of the glossy paint causes the light reflecting off of the surface to be polarized based on the characteristics of the transparent or translucent layer (e.g., based on the thickness and surface normals of the layer), which are encoded in the light ray hitting the image sensor. Similarly, as discussed in more detail below with respect to shape from polarization (SfP) theory, variations in the shape of the surface (e.g., direction of the surface normals) may cause significant changes in the polarization of light reflected by the surface of the object. For example, smooth surfaces may generally exhibit the same polarization characteristics throughout, but a scratch or a dent in the surface changes the direction of the surface normals in those areas, and light hitting scratches or dents may be polarized, attenuated, or reflected in ways different than in other portions of the surface of the object. Models of the interactions between light and matter generally consider three fundamentals: geometry, lighting, and material. Geometry is based on the shape of the material. Lighting includes the direction and color of the lighting. Material can be parameterized by the refractive index or angular reflection/transmission of light. This angular reflection is known as a bi-directional reflectance distribution function (BRDF), although other functional forms may more accurately represent certain scenarios. For example, the bidirectional subsurface scattering distribution function (BSSRDF) would be more accurate in the context of materials that exhibit subsurface scattering (e.g. marble or wax).

A light ray 43 hitting the image sensor 14 of a polarization camera has three measurable components: the intensity of light (intensity image/I), the percentage or proportion of light that is linearly polarized (degree of linear polarization/ DOLP/$\rho$), and the direction of that linear polarization (angle of linear polarization/AOLP/$\phi$). These properties encode information about the surface curvature and material of the object being imaged, which can be used by the pose estimator 120 to detect transparent objects, as described in more detail below. In some embodiments, by using one or more polarization cameras, the pose estimator 120 can detect the shapes of optically challenging objects (e.g., that include surfaces made of materials having optically challenging properties such as transparency, reflectivity, or dark matte surfaces) based on similar polarization properties of light passing through translucent objects and/or light interacting with multipath inducing objects or by non-reflective objects (e.g., matte black objects).

In more detail, the polarization camera 11 may further include a polarizer or polarizing filter or polarization mask 16 placed in the optical path between the scene 1 and the image sensor 14. According to various embodiments of the present disclosure, the polarizer or polarization mask 16 is configured to enable the polarization camera 11 to capture images of the scene 1 with the polarizer set at various specified angles (e.g., at 45° rotations or at 60° rotations or at non-uniformly spaced rotations).

As one example, FIG. 2 depicts an embodiment where the polarization mask 16 is a polarization mosaic aligned with the pixel grid of the image sensor 14 in a manner similar to a red-green-blue (RGB) color filter (e.g., a Bayer filter) of a color camera. In a manner similar to how a color filter mosaic filters incoming light based on wavelength such that each pixel in the image sensor 14 receives light in a particular portion of the spectrum (e.g., red, green, or blue) in accordance with the pattern of color filters of the mosaic, a polarization mask 16 using a polarization mosaic filters light based on linear polarization such that different pixels receive light at different angles of linear polarization (e.g., at 0°, 45°, 90°, and 135°, or at 0°, 60° degrees, and 120°). Accordingly, the polarization camera 11 using a polarization mask 16 such as that shown in FIG. 2 is capable of concurrently or simultaneously capturing light at four different linear polarizations. One example of a polarization camera is the Blackfly® S Polarization Camera produced by FLIR® Systems, Inc. of Wilsonville, Oregon.

While the above description relates to some possible implementations of a polarization camera using a polarization mosaic, embodiments of the present disclosure are not limited thereto and encompass other types of polarization cameras that are capable of capturing images at multiple different polarizations. For example, the polarization mask 16 may have fewer than four polarizations or more than four different polarizations, or may have polarizations at different angles than those stated above (e.g., at angles of polarization of: 0°, 60°, and 120° or at angles of polarization of 0°, 30°, 60°, 90°, 120°, and 150°). As another example, the polarization mask 16 may be implemented using an electronically controlled polarization mask, such as an electro-optic modulator (e.g., may include a liquid crystal layer), where the polarization angles of the individual pixels of the mask may be independently controlled, such that different portions of the image sensor 14 receive light having different polarizations. As another example, the electro-optic modulator may be configured to transmit light of different linear polarizations when capturing different frames, e.g., so that the camera captures images with the entirety of the polarization mask set to, sequentially, to different linear polarizer angles (e.g., sequentially set to: 0 degrees; 45 degrees; 90 degrees; or 135 degrees). As another example, the polarization mask 16 may include a polarizing filter that rotates mechanically, such that different polarization raw frames are captured by the polarization camera 11 with the polarizing filter mechanically rotated with respect to the lens 17 to transmit light at different angles of polarization to image sensor 14. Furthermore, while the above examples relate to the use of a linear polarizing filter, embodiments of the present disclosure are not limited thereto and also include the use of polarization cameras that include circular polarizing filters (e.g., linear polarizing filters with a quarter wave plate). Accordingly, in various embodiments of the present disclosure, a polarization camera uses a polarizing filter to capture multiple polarization raw frames at different polarizations of light, such as different linear polarization angles and different circular polarizations (e.g., handedness).

As a result, the polarization camera 11 captures multiple input images (or polarization raw frames) of the scene including the surfaces of the objects 22. In some embodiments, each of the polarization raw frames corresponds to an image taken behind a polarization filter or polarizer at a different angle of polarization $\phi_{pol}$ (e.g., 0 degrees, 45 degrees, 90 degrees, or 135 degrees). Each of the polarization raw frames is captured from substantially the same pose with respect to the scene 1 (e.g., the images captured with the polarization filter at 0 degrees, 45 degrees, 90 degrees, or 135 degrees are all captured by a same polarization camera 11 located at a same location and orientation), as opposed to capturing the polarization raw frames from disparate locations and orientations with respect to the scene. The polarization camera 11 may be configured to detect light in a variety of different portions of the electromagnetic spectrum, such as the human-visible portion of the electromagnetic spectrum, red, green, and blue portions of the human-visible spectrum, as well as invisible portions of the electromagnetic spectrum such as infrared and ultraviolet.

FIG. 3A is a perspective view of a camera array 110' according to one embodiment of the present disclosure. FIG. 3B is a cross sectional view of a portion of a camera array 110' according to one embodiment of the present disclosure.

Some aspects of embodiments of the present disclosure relate to a camera array in which multiple cameras (e.g., cameras having different imaging modalities and/or sensitivity to different spectra) are arranged adjacent to one another and in an array and may be controlled to capture images in a group (e.g., a single trigger may be used to control all of the cameras in the system to capture images concurrently or substantially simultaneously). In some embodiments, the individual cameras are arranged such that parallax shift between cameras is substantially negligible based on the designed operating distance of the camera system to objects 2 and 3 in the scene 1, where larger spacings between the cameras may be tolerated when the designed operating distance is large.

FIG. 3B shows a cross sectional view of two of the cameras or camera modules 10A' and 10B' of the camera array 110' shown in FIG. 3A. As seen in FIG. 3B, each camera or camera module (10A' and 10B') includes a corresponding lens, a corresponding image sensor, and may include one or more corresponding filters. For example, in some embodiments, camera 10A' is a visible light color camera that includes lens 12A', image sensor 14A', and color filter 16A' (e.g., a Bayer filter). In the embodiment shown in FIG. 3B, the filter 16 is located behind the lens 12 (e.g., between the lens 12 and the image sensor 14), but embodiments of the present disclosure are not limited thereto. In some embodiments, the filter 16 is located in front of the lens 12, and in some embodiments, the filter 16 may include multiple separate components, where some components are located in front of the lens and other components are located behind the lens (e.g., a polarizing filter in front of the lens 12 and a color filter behind the lens 12). In some embodiments, camera 10B' is a polarization camera that includes lens 12B', image sensor 14B', and polarizing filter 16B' (a polarization camera may also include a visible light color filter or other filter for passing a particular portion of the electromagnetic spectrum, such as an infrared filter, ultraviolet filter, and the like). In some embodiments of the present disclosure, the image sensors four cameras 10A', 10B', 10C', and 10D' are monolithically formed on a same semiconductor die, and the four cameras are located in a same housing with separate apertures for the lenses 12 corresponding to the different image sensors. Similarly, the filters 16 may correspond to different portions of a single physical layer that has different optical filter functions (e.g., different linear polarizing angles or circular polarizers, color filters with corresponding spectral response functions, and the like) in different regions of the layer (corresponding to the different cameras). In some embodiments, a filter 16 of a polarization camera includes a polarization mask 16 similar to the Sony® IMX250MZR sensor, which includes a polarization mosaic aligned with the pixel grid of the image sensor 14 in a manner similar to a red-green-blue (RGB) color filter (e.g., a Bayer filter) of a color camera. In a manner similar to how a color filter mosaic filters incoming light based on wavelength such that each pixel in the image sensor 14 receives light in a particular portion of the spectrum (e.g., red, green, or blue) in accordance with the pattern of color filters of the mosaic, a polarization mask 16 using a polarization mosaic filters light based on linear polarization such that different pixels receive light at different angles of linear polarization (e.g., at 0°, 45°, 90°, and 135°, or at 0°, 60° degrees, and 120°). Accordingly, a camera of the camera array 110' may use a polarization mask 16 to concurrently or simultaneously capture light at four different linear polarizations.

In some embodiments, a demosaicing process is used to compute separate red, green, and blue channels from the raw data. In some embodiments of the present disclosure, each polarization camera may be used without a color filter or with filters used to transmit or selectively transmit various other portions of the electromagnetic spectrum, such as infrared light.

As noted above, embodiments of the present disclosure relate to multi-modal and/or multi-spectral camera arrays. Accordingly, in various embodiments of the present disclosure, the cameras within a particular camera array include cameras configured to perform imaging in a plurality of different modalities and/or to capture information in a plurality of different spectra.

As one example, in some embodiments, the first camera 10A' is a visible light camera that is configured to capture color images in a visible portion of the electromagnetic spectrum, such as by including a Bayer color filter 16A' (and, in some cases, a filter to block infrared light), and the second camera 10B', third camera 10C', and fourth camera 10D' are polarization cameras having different polarization filters, such filters having linear polarization angles of 0°, 60°, and 120°, respectively. The polarizing filters in the optical paths of each of the cameras in the array cause differently polarized light to reach the image sensors of the cameras. The individual polarization cameras in the camera array have optical axes that are substantially perpendicular to one another, are placed adjacent to one another, and have substantially the same field of view, such that the cameras in the camera array capture substantially the same view of a scene as the visible light camera 10A', but with different polarizations. While the embodiment shown in FIG. 3A includes a 2×2 array of four cameras, three of which are polarization cameras, embodiments of the present disclosure are not limited thereto, and the camera array may more than three polarization cameras, each having a polarizing filter with a different polarization state (e.g., a camera array may have four polarization cameras along with the visible light color camera 10A', where the polarization cameras may have polarization filters with angles of linear polarization, such as 0°, 45°, 90°, and 135°). In some embodiments, one or more of the cameras may include a circular polarizer.

As another example, one or more of the cameras in the camera array 110' may operate in other imaging modalities and/or other imaging spectra, such as polarization, near infrared, far infrared, shortwave infrared (SWIR), longwave infrared (LWIR) or thermal, ultraviolet, and the like, by including appropriate filters 16 (e.g., filters that pass light having particular polarizations, near-infrared light, SWIR light, LWIR light, ultraviolet light, and the like) and/or image sensors 14 (e.g., image sensors optimized for particular wavelengths of electromagnetic radiation) for the particular modality and/or portion of the electromagnetic spectrum.

For example, in the embodiment of the camera array 110' shown in FIG. 3A, four cameras 10A', 10B', 10C', and 10D' are arranged in a 2×2 grid to form a camera array, where the four cameras have substantially parallel optical axes. In addition, the optical axes of the camera modules of the camera array are arranged close together such that the camera modules capture images from substantially the same viewpoint with respect to the objects in the scene 1. One of skill in the art would understand that the acceptable spacing between the optical axes of the camera modules within an array in order to capture images of the scene from substantially the same viewpoint depends on the working distance to objects 22 in the scene, where longer working distances allow for larger spacing between the optical axes while shorter working distances may require closer or tighter spacing between the optical axes. The four cameras may be controlled together such that they capture images substantially simultaneously. In some embodiments, the four cameras are configured to capture images using the same exposure settings (e.g., same aperture, length of exposure, and gain or "ISO" settings). In some embodiments, the exposure settings for the different cameras can be controlled independently from one another (e.g., different settings for each camera), where the pose estimator 120 jointly or holistically sets the exposure settings for the cameras based on the current conditions of the scene 1 and the characteristics of the imaging modalities and spectral responses of the cameras 10A', 10B', 10C', and 10D' of the camera array 110'.

In some embodiments, the various individual cameras of the camera array are registered with one another by determining their relative poses (or relative positions and orientations) by capturing multiple images of a calibration target, such as a checkerboard pattern, an ArUco target (see, e.g., Garrido-Jurado, Sergio, et al. "Automatic generation and detection of highly reliable fiducial markers under occlusion." *Pattern Recognition* 47.6 (2014): 390-402.) or a ChArUco target (see, e.g., An, Gwon Hwan, et al. "Charuco board-based omnidirectional camera calibration method." *Electronics* 7.12 (2018): 421.). In particular, the process of calibrating the targets may include computing intrinsic matrices characterizing the internal parameters of each camera (e.g., matrices characterizing the focal length, image sensor format, and principal point of the camera) and extrinsic matrices characterizing the pose of each camera with respect to world coordinates (e.g., matrices for performing transformations between camera coordinate space and world or scene coordinate space). Different cameras within a camera array may have image sensors with different sensor formats (e.g., aspect ratios) and/or different resolutions without limitation, and the computed intrinsic and extrinsic parameters of the individual cameras enable the pose estimator 120 to map different portions of the different images to a same coordinate space (where possible, such as where the fields of view overlap).

Figure 3C:
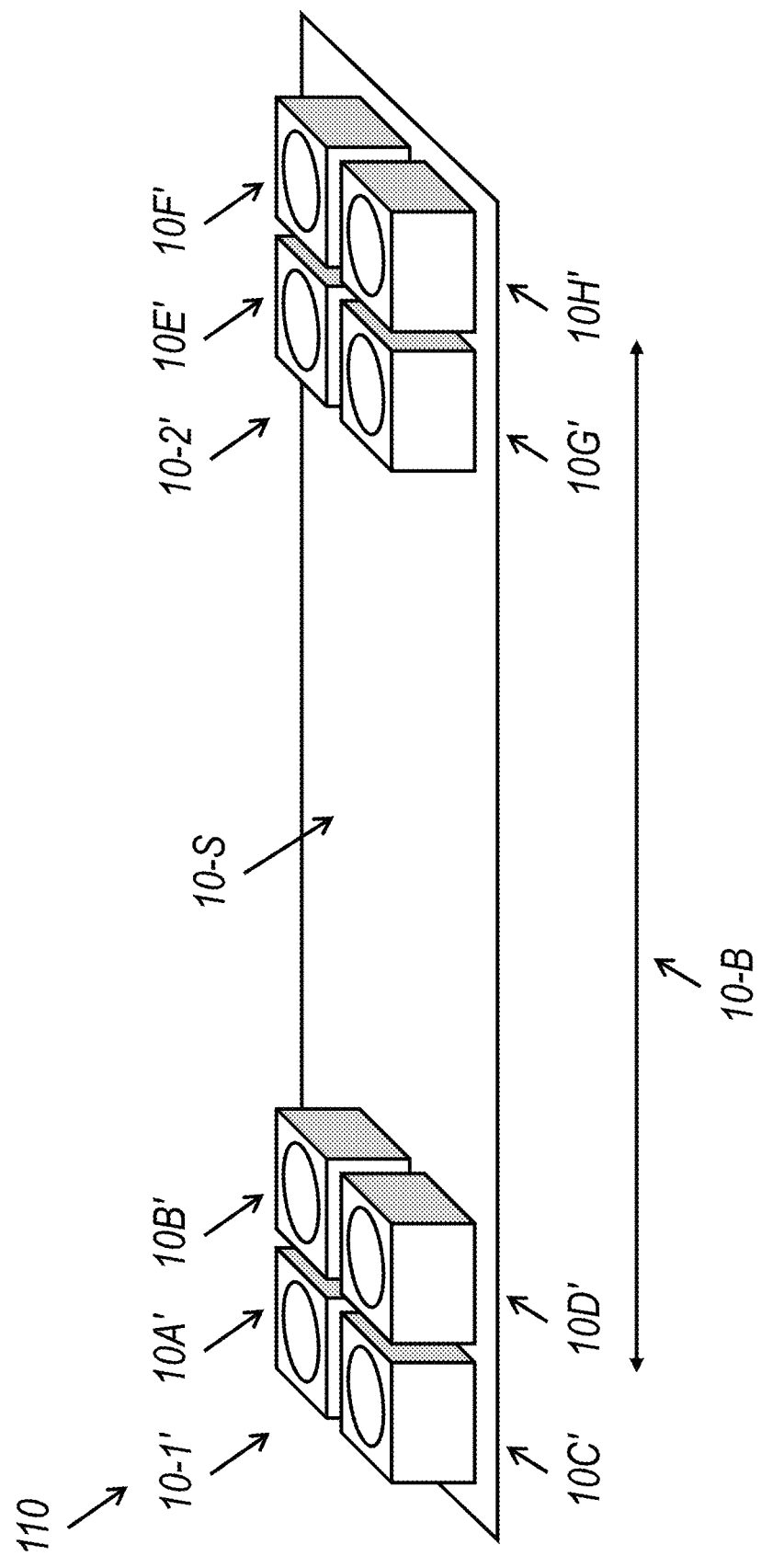
FIG. 3C is a perspective view of a stereo camera array system, according to one embodiment of the present disclosure.

FIG. 3C is a perspective view of a stereo camera array system 110 according to one embodiment of the present disclosure. For some applications, stereo vision techniques are used to capture multiple images of scene from different perspectives. As noted above, in some embodiments of the present disclosure, individual cameras (or camera modules) within a camera array 110' are placed adjacent to one another such that parallax shifts between the cameras are small or substantially negligible based on the designed operating distance of the camera system to the subjects being imaged (e.g., where the parallax shifts between cameras of a same array are less than a pixel for objects at the operating distance). In addition, as noted above, in some embodiments, differences in the poses of the individual cameras within a camera array 110' are corrected through image registration based on the calibrations (e.g., computed intrinsic and extrinsic parameters) of the cameras such that the images are aligned to a same coordinate system for the viewpoint of the camera array.

In stereo camera array systems according to some embodiments, the camera arrays are spaced apart from one another such that parallax shifts between the viewpoints corresponding to the camera arrays are detectable for objects in the designed operating distance of the camera system. This enables the distances to various surfaces in a scene (the "depth") to be detected in accordance with a disparity measure or a magnitude of a parallax shift (e.g., larger parallax shifts in the locations of corresponding portions of the images indicate that those corresponding portions are on surfaces that are closer to the camera system and smaller parallax shifts indicate that the corresponding portions are on surfaces that are farther away from the camera system). These techniques for computing depth based on parallax shifts are sometimes referred to as Depth from Stereo Accordingly, FIG. 3C depicts a stereo camera array system 110 having a first camera array 10-1' and a second camera array 10-2' having substantially parallel optical axes and spaced apart along a baseline 10-B. In the embodiments shown in FIG. 3C, the first camera array 10-1' includes cameras 10A', 10B', 10C', and 10D' arranged in a 2×2 array similar to that shown in FIG. 3A and FIG. 3B. Likewise, the second camera array 10-2' includes cameras 10E', 10F', 10G', and 10H' arranged in a 2×2 array, and the overall stereo camera array system 110 includes eight individual cameras (e.g., eight separate image sensors behind eight separate lenses). In some embodiments of the present disclosure, corresponding cameras of the camera arrays 10-1' and 10-2' are of the same type or, in other words, configured to capture raw frames or images using substantially the same imaging modalities or in substantially the same spectra. In the specific embodiment shown in FIG. 3C, cameras 10A' and 10E' may be of a same first type, cameras 10B' and 10F' may be of a same second type, cameras 10C' and 10G' may be of a same third type, and cameras 10D' and 10H' may be of a same fourth type. For example, cameras 10A' and 10E' may both have linear polarizing filters at a same angle of 0°, cameras 10B' and 10F' may both have linear polarizing filters at a same angle of 45°, cameras 10C' and 10G' may both be viewpoint-independent cameras having no polarization filter (NF), such as near-infrared cameras, and cameras 10D' and 10H' may both have linear polarizing filters at a same angle of 90°. As another example, cameras 10A' and 10E' may both be viewpoint-independent cameras such as visible light cameras without polarization filters, cameras 10B' and 10F' may both be thermal cameras, cameras 10C' and 10G' may both have polarization masks with a mosaic pattern polarization filters at different angles of polarization (e.g., a repeating pattern with polarization angles of 0°, 45°, 90°, and 135°), and cameras 10D' and 10H' may both be thermal (LWIR) cameras.

While some embodiments are described above wherein each array includes cameras of different types in a same arrangement, embodiments of the present disclosure are not limited thereto. For example, in some embodiments, the arrangements of cameras within a camera array are mirrored along an axis perpendicular to the baseline 10-B. For example, cameras 10A' and 10F' may be of a same first type, cameras 10B' and 10E' may be of a same second type, cameras 10C' and 10H' may be of a same third type, and cameras 10D' and 10G' may be of a same fourth type.

In a manner similar to that described for calibrating or registering cameras within a camera array, the various polarization camera arrays of a stereo camera array system may also be registered with one another by capturing multiple images of calibration targets and computing intrinsic and extrinsic parameters for the various camera arrays. The camera arrays of a stereo camera array system 110 may be rigidly attached to a common rigid support structure 10-S in order to keep their relative poses substantially fixed (e.g., to reduce the need for recalibration to recompute their extrinsic parameters). The baseline 10-B between camera arrays is configurable in the sense that the distance between the camera arrays may be tailored based on a desired or expected operating distance to objects in a scene—when the operating distance is large, the baseline 10-B or spacing between the camera arrays may be longer, whereas the baseline 10-B or spacing between the camera arrays may be shorter (thereby allowing a more compact stereo camera array system) when the operating distance is smaller.

As noted above with respect to FIG. 2, a light ray 43 hitting the image sensor 14 of a polarization camera 10 has three measurable components: the intensity of light (intensity image/I), the percentage or proportion of light that is linearly polarized (degree of linear polarization/DOLP/$\rho$), and the direction of that linear polarization (angle of linear polarization/AOLP/$\phi$).

Measuring intensity I, DOLP $\rho$, and AOLP $\phi$ at each pixel requires 3 or more polarization raw frames of a scene taken behind polarizing filters (or polarizers) at different angles, $\phi_{pol}$ (e.g., because there are three unknown values to be determined: intensity I, DOLP $\rho$, and AOLP $\phi$. For example, a polarization camera such as those described above with respect to FIG. 2 captures polarization raw frames with four different polarization angles $\phi_{pol}$, e.g., 0 degrees, 45 degrees, 90 degrees, or 135 degrees, thereby producing four polarization raw frames $I_{\phi_{pol}}$, denoted herein as $I_0$, $I_{45}$, $I_{90}$, and $I_{135}$, and a camera module in accordance with some embodiments of FIGS. 3A, 3B, and 3C may capture polarization raw frames at three different polarization angles $\phi_{pol}$, e.g., 0 degrees, 60 degrees, and 120 degrees, thereby producing three polarization raw frames $I_{\phi_{pol}}$, denoted herein as $I_0$, $I_{60}$, and $I_{120}$.

The relationship between $I_{\phi_{pol}}$ and intensity I, DOLP $\rho$, and AOLP $\phi$ at each pixel can be expressed as:

$$I_{\phi_{pol}} = I(1 + \rho \cos(2(\phi - \phi_{pol}))) \tag{7}$$

Accordingly, with four different polarization raw frames $I_{\phi_{pol}}$ ($I_0$, $I_{45}$, $I_{90}$, and $I_{135}$), a system of four equations can be used to solve for the intensity I, DOLP $\rho$, and AOLP $\phi$.

Shape from Polarization (SfP) theory (see, e.g., Gary A Atkinson and Edwin R Hancock. Recovery of surface orientation from diffuse polarization. IEEE transactions on image processing, 15(6):1653-1664, 2006.) states that the relationship between the refractive index (n), azimuth angle ($\theta_a$) and zenith angle ($\theta_z$) of the surface normal of an object and the $\phi$ and $\rho$ components of the light ray coming from that object follow the following characteristics when diffuse reflection is dominant:

$$\rho = \frac{\left(n - \frac{1}{n}\right)^2 \sin^2(\theta_z)}{2 + 2n^2 - \left(n + \frac{1}{n}\right)^2 \sin^2\theta_z + 4\cos\theta_z\sqrt{n^2 - \sin^2\theta_z}} \tag{8}$$

$$\phi = \theta_a \tag{9}$$

and when the specular reflection is dominant:

$$\rho = \frac{2\sin^2\theta_z\cos\theta_z\sqrt{n^2 - \sin^2\theta_z}}{n^2 - \sin^2\theta_z - n^2\sin^2\theta_z + 2\sin^4\theta_z} \tag{10}$$

$$\phi = \theta_a - \frac{\pi}{2} \tag{11}$$

Note that in both cases $\rho$ increases exponentially as $\theta_z$ increases and if the refractive index is the same, specular reflection is much more polarized than diffuse reflection.

Accordingly, some aspects of embodiments of the present disclosure relate to applying SfP theory to detect or measure the gradients of surfaces (e.g., the orientation of surfaces or their surface normals or directions perpendicular to the surfaces) based on the raw polarization frames of the objects, as captured by the polarization camera. Computing these gradients produces a gradient map (or slope map or surface normals map) identifying the slope of the surface depicted at each pixel in the gradient map. These gradient maps can then be used when estimating the shape and/or pose of the object by supplying these gradient maps or surface normals maps to a trained computer vision model (e.g., a convolutional neural network) and/or by aligning a pre-existing 3-D model (e.g., CAD model) of the object with the measured surface normals (gradients or slopes) of the object in based on the slopes of the surfaces of the 3-D model.

One example of an imaging system according to embodiments of the present disclosure includes a stereo pair of 2×2 camera arrays, in an arrangement similar to that shown in FIG. 3C, Each 2×2 camera array includes three color (RGB) cameras with polarization filters at different angles to capture a diverse range of polarization signatures of the scene in the spectral bands (red, green, and blue) and fourth near-IR camera without a polarization filter to capture the scene in the near-IR spectral band. This stereo pair of 2×2 camera arrays may be combined with other cameras located at different viewpoints with respect to the scene, thereby providing a multi-view imaging system. The other cameras may also be similar stereo camera arrays (e.g., similar stereo pairs of 2×2 camera arrays) or monocular camera arrays (e.g., single camera arrays of closely-spaced camera modules), and the camera arrays, in the stereo or monocular case, may have different arrangements and numbers of camera modules in the array (e.g., a 3×2 arrangement of 6 camera modules), and where the camera modules may operate in different modalities (e.g., thermal, ultraviolet, depth from time of flight, polarization, and the like).

Figure 4:
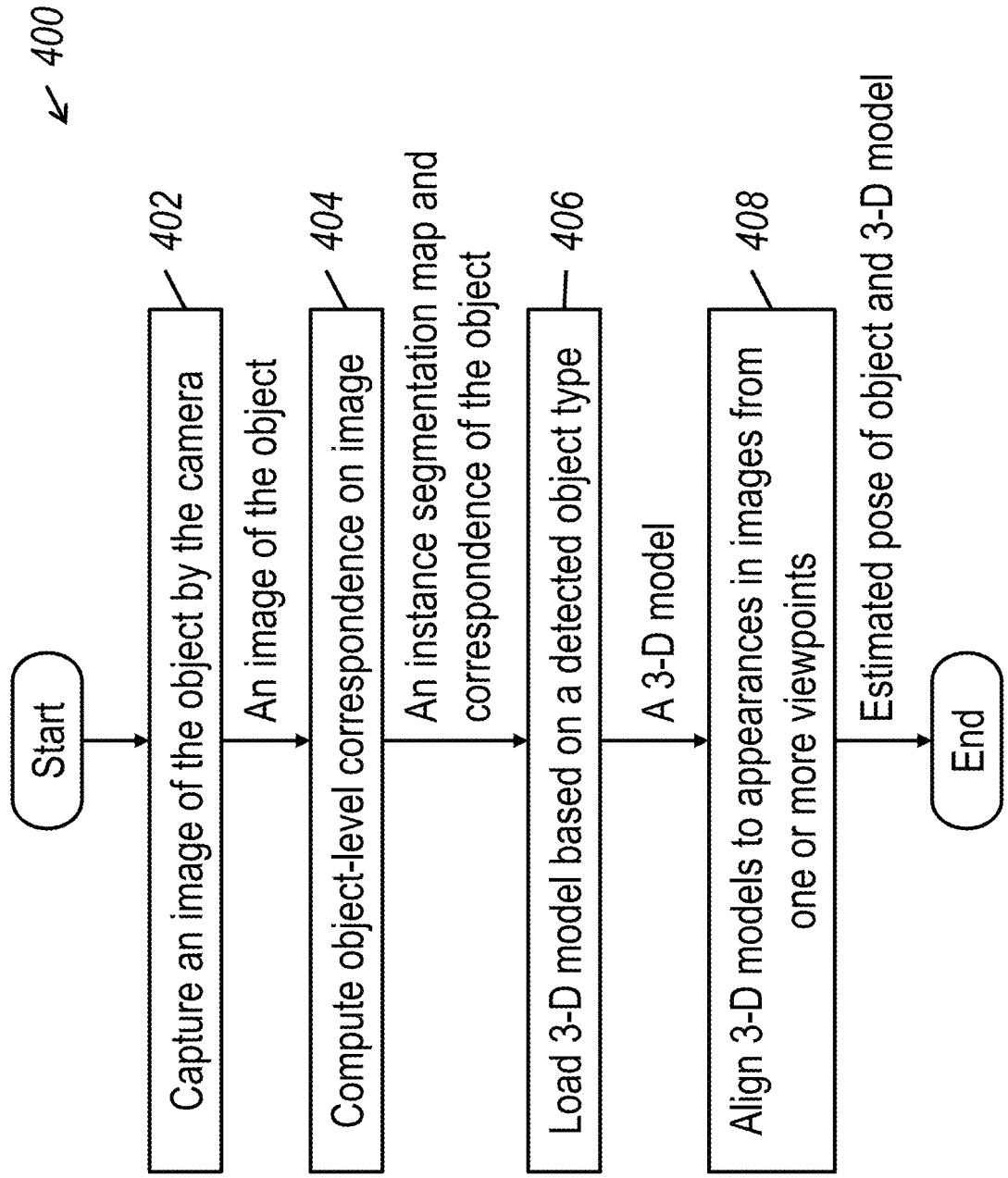
FIG. 4 is a flowchart depicting a method for computing an initial six-degree-of-freedom (6DoF) poses of the object, according to some embodiments of the present disclosure.

FIG. 4 is a flowchart depicting a method for computing an initial six-degree-of-freedom (6DoF) poses of the object 22, according to some embodiments of the present disclosure.

In act 402, the camera 110 captures an initial image of the object 22 as it is held by the robotic arm 24 (e.g., as it is being picked up). In some examples, the image capture may be prompted by a control signal from the pose estimator 120.

In embodiments in which the object 22 may be any one of a number of different types of objects, the pose estimator 120 computes the object-level correspondence on the image of the object 22, in act 404. That is, the type of object is identified in the image of the object 22. For example, when the scene 1 includes cubes and spheres, the process of instance segmentation identifies the pixels in the images that depict the object 22, in addition to labeling it separately based on the type or class of object (e.g., a classification as a "sphere" or a "cube") as well as an instance label (e.g., by assigning a unique label to the object, such as numerical labels "1," "2," "3," "4," or "5"). Accordingly, the pose estimator 120 generates a crop or patch for the object instance detected in the image.

Systems and methods for computing object-level correspondences are described in International Patent Application No. PCT/US21/15926, titled "SYSTEMS AND METHODS FOR POSE DETECTION AND MEASUREMENT," filed in the United States Patent and Trademark Office on Jan. 29, 2021, which, as noted above, is incorporated by reference herein in its entirety.

Once object level correspondence is performed, the search space for performing, for example, pixel-level correspondence, may be limited to the regions of the image that correspond to the object. Reducing the search space in this manner may result in faster processing of pixel-level correspondence and other similar tasks.

In act 406, the pose estimator 120 loads/identifies a 3-D model of the object 22 based on the detected object type. The 3-D model of the object may then be loaded from a library of 3-D models that correspond to various types of objects in the collection of objects 20. The 3-D models may each define a set of keypoints of the corresponding objects.

In embodiments in which all of the objects in the scene 1 that can be manipulated by the robotic arm 24 are of the same type and correspond to the same 3-D model, the pose estimator 120 may skip act 404 and load the corresponding 3-D model in act 460.

In act 408, the pose estimator 120 aligns the corresponding 3-D model to be consistent with the appearance of the object as seen from the one or more viewpoints. This alignment of the 3-D model provides the 6DoF pose of the object in a global coordinate system (e.g., a coordinate system based on the camera 110 or based on the robot controller 28). This 6DoF pose serves as the initial pose estimate of the object 22 before being moved by the robotic arm 24.

In some embodiments, the alignment of the 3-D model with the appearance of an object is performed by extracting observed keypoints of the object from a first depth map (from a stereo RGB camera) or a surface normals map (from a stereo polarization camera) contained within the first image data, identifying modeled keypoints defined by the 3-D model of the object, and applying an iterative closest point (ICP) algorithm or a point pair feature matching algorithm (see, e.g., Drost, Bertram, et al. "Model globally, match locally: Efficient and robust 3D object recognition." 2010 *IEEE Computer Society Conference on Computer Vision and Pattern Recognition.* IEEE, 2010.) to align the modeled keypoints with the observed keypoints, which aligns the 3-D model to the shape of the object as it appears in the depth image. The pose estimator 120 may then determine the initial pose estimate of the object based on the aligned observed keypoints.

Figure 5:
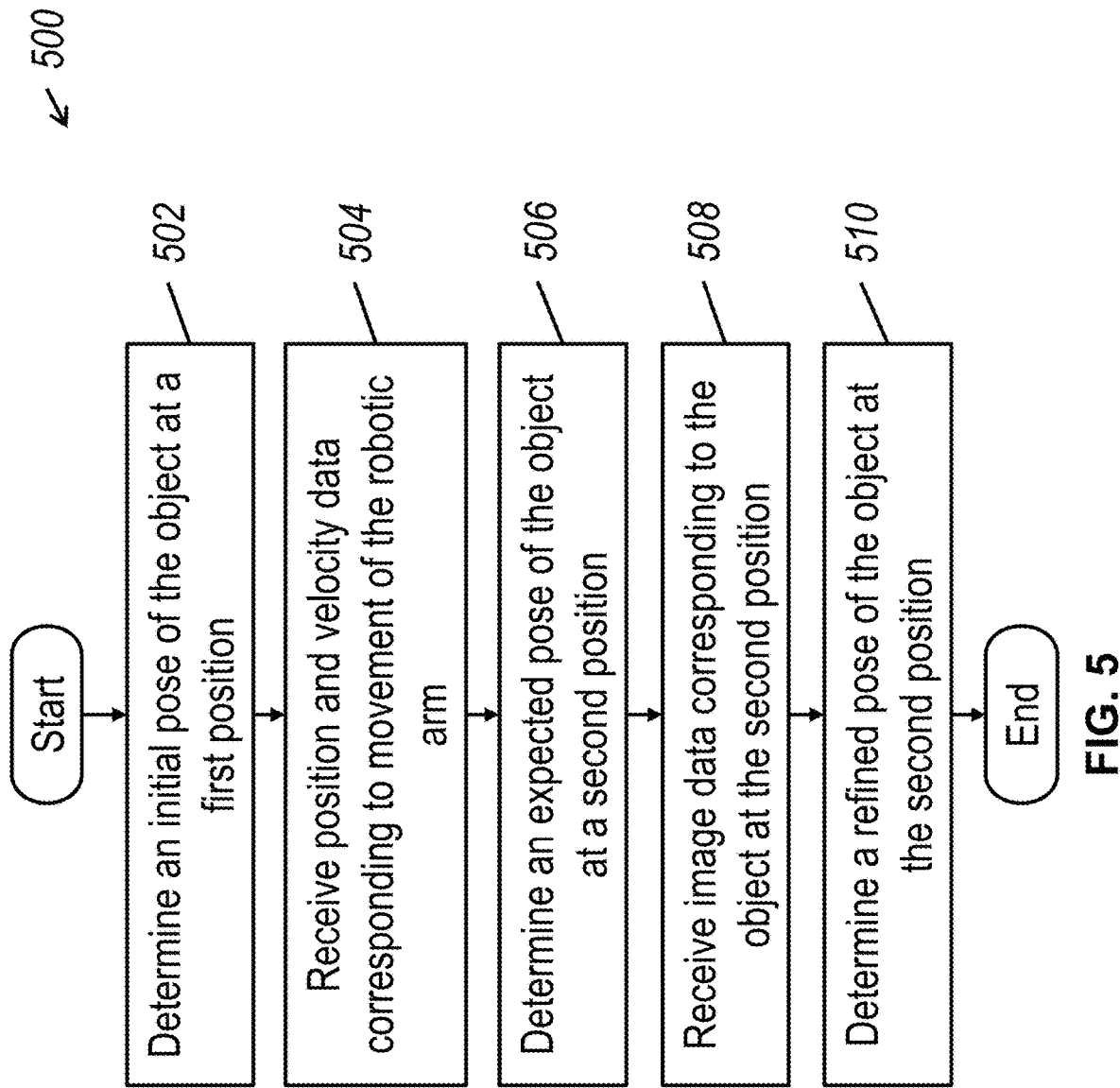
FIG. 5 illustrates a process of tracking the pose of the object, according to some embodiments of the present disclosure.

FIG. 5 illustrates a process 500 of tracking the pose of the object 22, according to some embodiments of the present disclosure.

In act 502, the pose estimator 120 determines the initial pose of the object 22 at a first position (e.g., when grasped by the robotic arm 24 but before moving), as described with respect to the process of FIG. 4.

In act 504, the pose estimator 120 receives position and velocity data corresponding to movement of the robotic arm 24 (e.g., movement of the end effector 26) object 22 to a second position by a robotic arm 24. In some examples, the motion of the robotic arm may be preprogrammed, and the pose estimator 120 may have knowledge of the position and velocity data prior to the determination of the initial pose in act 502.

In act 506, the pose estimator 120 determines an expected pose of the object 22 at a second position based on the position and velocity data and the initial pose. The second position may represent any point along the path of the robotic arm 24. For example, the second position may be at the end of the path taken by the robotic arm 24, just before placement of the object 22. As panning/shifting and rotation operations that correspond to the movement of the robotic arm 24 may be represented by matrix operations, in some embodiments, the pose estimator 120 generates the expected pose by applying shifting (e.g., translation) and/or rotation matrix transformations (that correspond to the movement of the robotic arm) to the initial pose. In some embodiments, the matrix transformations may be applied to the initial keypoints that may be identified based on the initial pose. The pose estimator 120 may then determine the expected pose based on the transformed keypoints (also referred to as the expected keypoints). As the actual movement of the robotic arm 24 in the real world may not exactly match the preprogrammed motion, the expected pose of the object may also not exactly match (and thus deviate from) the actual real-world pose of the object 22 at the second position. As such, according to some embodiments, the pose estimator 120 further refines this pose, as described below.

In act 508, the pose estimator 120 receives second image data corresponding to the object 22 at the second position from the camera 110. As detailed above, the camera 110 may be a stereo camera that produces a second depth map of the object 22. The image data may include the second depth map as well as other meta data, such as time of capture as well as position and orientation of the camera 110 at the time of capture.

In act 510, the pose estimator 120 determines a refined pose of the object at the second position based on the second image data and the expected pose. In some embodiments, the second image data includes a second depth map/image (from a stereo RGB camera) or a surface normals map (from a stereo polarization camera) and the pose estimator 120 identifies estimated keypoints of the object 22 at the second position based on the second depth map or surface normals map of the object 22. The pose estimator 120 aligns the estimated keypoints with the expected keypoints, by applying the iterative closest point (ICP) algorithm or the point pair feature matching algorithm to the estimated and expected keypoints, to generate aligned keypoints. The pose estimator 120 then determines the refined pose of the object 22 based on the aligned keypoints. Given that the expected pose, which is calculated analytically, is already close to the actual pose of the object 22, using the expected pose (e.g., the expected keypoints) as the initial condition for the ICP or the point pair feature matching algorithm provides a more accurate refinement of the estimated object pose and allows for faster convergence of the alignment algorithm than attempting to compute the pose of the object 22 at the second position without the benefit of the knowledge of the expected pose of the object 22. As such, according to some embodiments, this faster processing allows the pose estimator 120 to track the movements and pose of the object 22 in real time or in near real-time, which is desirable in many assembly applications.

In embodiments in which the pose tracking system 100 includes a plurality of cameras including a first camera 110a and a second camera 110b (e.g., as in the embodiments of FIG. 1B), the first image data may be captured by the first camera 110a and the second image data may be captured by the second camera 110b. In examples in which a plurality of cameras capture the images (e.g., depth images) of the object at a particular location from different viewpoints, the pose estimator 120 may synchronize the application of the alignment algorithm (e.g., ICP or point pair feature matching) to the image data from different cameras 110. In such examples, to improve processing time and to enable real-time pose tracking, the processing of the alignment algorithms may be parallelized (e.g., each may be processed by a different core of a processor or by a different processor altogether).

In some embodiments, the camera 110 (e.g., 110a/110b) is calibrated with the robotic arm 24 at the first position. However, movement of the robotic arm 24 may cause it to fall out of calibration with the camera 110. As the calibration pattern 27 on the robotic arm 24 may be visible in the image of the object 22 captured by the camera 110, in some embodiments, the camera 110 and the robotic arm 24 may be recalibrated using the same image as that used by the alignment algorithm. Given the initial calibration and the known transformation matrix corresponding to the motion of the robotic arm 24, the pose estimator 120 may analytically compute expected calibration points of the calibration pattern 27, identify observed calibration points on the calibration pattern captured in the image (e.g., second image), and use the expected calibration points as the initial condition for the alignment algorithm to refine the observed calibration points. The pose estimator 120 may then recalibrate the camera 110 to the robotic arm 24 base on the refined calibration points. This allows for fast recalibration, which serves to reduce or minimize calibration drift during movement of the robotic arm 24.

Accordingly, as described above, the pose tracking system 100 may track objects having many different types of material (e.g., opaque, glossy, transparent, etc.) without relying on expensive depth sensors. Further, by not having to train different Markov Decision Processes (MDPs) for different applications, the lead time to deployment of the pose tracking system 100 may be substantially reduced, even when the pose tracking system 100 is being used with objects and/or robotic arms that are significantly different from those used in designing and training the pose tracking system 100 or in other deployments of the pose tracking system 100. The pose tracking system according to some embodiments is capable of tracking 6DoF pose of a moving object in real-time, and is thus able to quickly identify any slippage of the object from the robotic arm (e.g., from the end effectors), which may reduce cycle time for pick and place applications. Additionally, as the use of the pose tracking system involves little to no human intervention, the workplace safety may improve for human operators.

The operations performed by the constituent components of the pose tracking system of the present disclosure may be performed by a "processing circuit" or "processor" that may include any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed wiring board (PWB) or distributed over several interconnected PWBs. A processing circuit may contain other processing circuits; for example, a processing circuit may include two processing circuits, an FPGA and a CPU, interconnected on a PWB.

It will be understood that, although the terms "first", "second", "third", etc., may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section, without departing from the scope of the inventive concept.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Further, the use of "may" when describing embodiments of the inventive concept refers to "one or more embodiments of the inventive concept". Also, the term "exemplary" is intended to refer to an example or illustration.

It will be understood that when an element or layer is referred to as being "on", "connected to", "coupled to", or "adjacent" another element or layer, it can be directly on, connected to, coupled to, or adjacent the other element or layer, or one or more intervening elements or layers may be present. When an element or layer is referred to as being "directly on," "directly connected to", "directly coupled to", or "immediately adjacent" another element or layer, there are no intervening elements or layers present.

As used herein, the term "substantially," "about," and similar terms are used as terms of approximation and not as terms of degree, and are intended to account for the inherent variations in measured or calculated values that would be recognized by those of ordinary skill in the art.

As used herein, the terms "use", "using", and "used" may be considered synonymous with the terms "utilize", "utilizing", and "utilized", respectively.

Further, the use of "may" when describing embodiments of the inventive concept refers to "one or more embodiments of the inventive concept." Also, the term "exemplary" is intended to refer to an example or illustration.

While the present disclosure has been described in connection with certain exemplary embodiments, it is to be understood that the disclosure is not limited to the disclosed embodiments, but, on the contrary, is intended to cover various modifications and equivalent arrangements included within the spirit and scope of the appended claims, and equivalents thereof.

What is claimed is:

1. A method of tracking a pose of an object, the method comprising:
    moving, by a robotic arm in a workcell, a physical object along a path;
    determining, from one or more first images captured by one or more first cameras in the workcell, an initial pose of the object at a first position on the path;
    receiving position data and velocity data corresponding to movement of the object along the path to a second position on the path by the robotic arm;
    determining an expected pose of the object at the second position on the path based on the position and velocity data and the initial pose of the object;
    receiving second image data captured by one or more second cameras in the workcell, the second image data being image data of the object at the second position; and
    determining a refined pose of the object at the second position based on the second image data and the expected pose, including:
        determining expected keypoints on the expected pose of the object and estimated keypoints on the object from the second image data,
        providing the expected pose as an initial condition to a keypoint alignment process to compute an alignment of the expected keypoints and the estimated keypoints, and
        computing the refined pose from the alignment of the expected keypoints and the estimated keypoints.

2. The method of claim 1, wherein the robotic arm is configured to grasp the object and to move the object from the first position to the second position.

3. The method of claim 1, wherein the one or more second cameras comprise a stereo-pair of camera modules, and
    wherein the second image data comprises a depth map or a surface normals map of the object at the second position.

4. The method of claim 1, wherein the initial pose, the expected pose, and the refined pose each correspond to a six-degrees-of-freedom (6DoF) pose of the object.

5. The method of claim 1, wherein the determining the initial pose of the object at the first position comprises:
    receiving first image data corresponding to the object at the first position from the one or more first cameras;
    identifying a 3-D model corresponding to the object; and
    aligning the 3-D model to be consistent with an appearance of the object associated with the first image data, and to generate the initial pose of the object.

6. The method of claim 5, wherein the first image data comprises a first depth map or a first surface normals map of the object, and
    wherein the aligning the 3-D model comprises:
        extracting observed keypoints of the object from the first depth map or the first surface normals map of the object.

7. The method of claim 6, wherein the 3-D model comprises a plurality of modeled keypoints of the object, and
    wherein the aligning the 3-D model further comprises:
        applying an iterative closest point (ICP) algorithm or a point pair feature matching algorithm to align the modeled keypoints with the observed keypoints.

8. The method of claim 1, wherein determining the expected pose of the object at the second position comprises:
    identifying initial keypoints of the object based on the initial pose;
    performing transformations on the initial keypoints based on the position and velocity data to generate expected keypoints; and
    determining the expected pose based on the expected keypoints.

9. The method of claim 8, wherein the refined pose is a more accurate representation of an actual pose of the object than the expected pose.

10. The method of claim 1, wherein performing the keypoint alignment process comprises:
    identifying the estimated keypoints of the object based on the second image data; and
    aligning the estimated keypoints with the expected keypoints by applying an iterative closest point (ICP) algorithm or a point pair feature matching algorithm to the estimated keypoints and the expected keypoints to generate aligned keypoints.

11. The method of claim 10, wherein the second image data comprises a second depth map or a second surface normals map of the object, and
    wherein identifying the estimated keypoints comprises:
        extracting the estimated keypoints of the object from the second depth map or the second surface normals map of the object.

12. The method of claim 1, further comprising:
    calibrating a first camera to the robotic arm at the first position; and
    recalibrating the first camera to the robotic arm at the second position based on the second image data,
    wherein the second image data comprises calibration pattern data corresponding to a calibration pattern on the robotic arm.

13. The method of claim 12, wherein the recalibrating the first camera to the robotic arm at the second position comprises:
    computing expected calibration points based on the position and velocity data and an initial calibration of the first camera to the robotic arm;
    identifying observed calibration points based on the second image data;
    aligning the observed calibration points with the expected calibration points, by applying an iterative closest point (ICP) algorithm or a point pair feature matching algorithm to the observed and expected calibration points, to generate refined calibration points; and
    calibrating the first camera to the robotic arm based on the refined calibration points.

14. A pose tracking system comprising:
    a robotic arm; and
    one or more computers and one or more storage devices storing instructions that are operable, when executed by the one or more computers, to cause the one or more computers to perform operations comprising:

providing instructions to the robotic arm that cause the robotic arm to move a physical object along a path in a workcell;

determining, from one or more first images captured by one or more first cameras in the workcell, an initial pose of the object at a first position on the path;

receiving position data and velocity data corresponding to movement of the object along the path to a second position on the path by the robotic arm;

determining an expected pose of the object at the second position on the path based on the position and velocity data and the initial pose of the object;

receiving second image data captured by one or more second cameras in the workcell, the second image data being image data of the object at the second position; and determining a refined pose of the object at the second position based on the second image data and the expected pose, including:

determining expected keypoints on the expected pose of the object and estimated keypoints on the object from the second image data, providing the expected pose as an initial condition to a keypoint alignment process to compute an alignment of the expected keypoints and the estimated keypoints, and computing the refined pose from the alignment of the expected keypoints and the estimated keypoints.

15. The pose tracking system of claim 14, wherein the robotic arm is configured to grasp the object and to move the object from the first position to the second position.

16. The pose tracking system of claim 14, further comprising a moveable camera platform configured to track movements of the robotic arm and to keep the object within a field of view of the one or more first cameras or the one or more second cameras, or both.

17. The pose tracking system of claim 14, wherein the one or more first cameras or one or more second cameras comprise a plurality of stereo-pair cameras having partially overlapping fields of view that cover an entire range of motion of the moving device.

18. The pose tracking system of claim 14, wherein determining the expected pose of the object at the second position comprises:

identifying initial keypoints of the object based on the initial pose;

performing transformations on the initial keypoints based on the position and velocity data to generate expected keypoints; and determining the expected pose based on the expected keypoints.

19. The pose tracking system of claim 14, wherein performing the keypoint alignment process comprises:

identifying the estimated keypoints of the object based on the second image data; and aligning the estimated keypoints with the expected keypoints by applying an iterative closest point (ICP) algorithm or a point pair feature matching algorithm to the estimated keypoints and the expected keypoints to generate aligned keypoints.

20. The pose tracking system of claim 19, wherein the second image data comprises a second depth map or a second surface normals map of the object, and wherein the identifying the estimated keypoints comprises:

extracting the estimated keypoints of the object from the second depth map or the second surface normals map of the object.

* * * * *